Dec. 21, 1965  V. CLAIR, JR  3,224,658
COLD PRESSURE WELDING APPARATUS
Filed Aug. 12, 1963  2 Sheets-Sheet 1
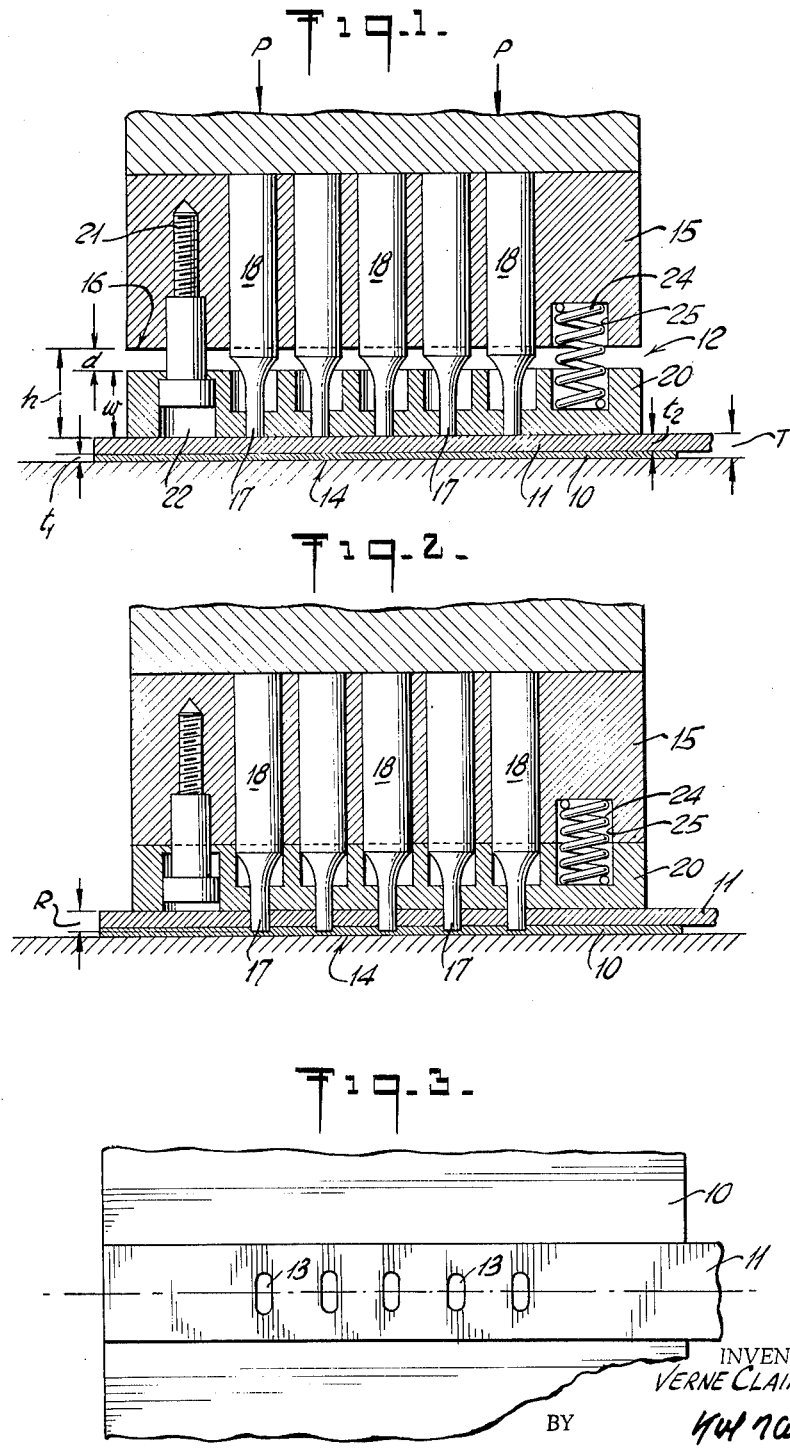
INVENTOR.
VERNE CLAIR, JR.
BY
ATTORNEY

INVENTOR.
VERNE CLAIR, JR.
ATTORNEY

United States Patent Office 3,224,658
Patented Dec. 21, 1965

3,224,658
COLD PRESSURE WELDING APPARATUS
Verne Clair, Jr., New Hartford, N.Y., assignor to Kelsey-Hayes Company, Romulus, Mich., a corporation of Delaware
Filed Aug. 12, 1963, Ser. No. 301,472
9 Claims. (Cl. 228—1)

The present invention relates to cold pressure welding, or welding at room temperature by the application of localized pressure to a pair of cold pressure weldable metal members to be welded, to create an intense interfacial metal flow at the weld area or spot conducive to joining the members by a solid phase welding bond thereat.

There is described in U.S. Patents Nos. 2,522,408 and 2,736,090 a method and tool arrangement for producing an indentation pressure lap joint by means of a suitable impression tool or die, having a shape and size determined by the gauge thickness and composition of the members being welded, by effecting a predetermined tool penetration or indentation at the weld spot or area, such as to result in a weld joint of adequate mechanical strength, on the one hand, while involving a minimum of metal distortion or displacement at or near the weld area, on the other hand. As an example, satisfactory welds may be obtained in the case of aluminum by a weld spot of oblong rectangular cross-section having a width from about 1.5 to 2 times the gauge thickness of the members being welded, such as plates, sheets or strips, and having a length from about 3 to 5 times said thickness with the metal reduction at the weld being about 75% of the total thickness of the members. In the case of copper, the indentation required is about 85% of the total thickness and varies for other metals of different ductility or cold weldability in accordance with the table of the "figures of merit" given in Patent No. 2,522,408.

In the case of a single-sided indentation weld, forming the special subject of the present invention, control of the tool penetration or depth of the indentation according to existing practice may be effected either by the provision of a suitable stop or abutment member operably associated with the pressure tool or press used to produce the welding pressure, to limit the relative movement of the tool members, in such a manner as to result in the desired tool penetration or metal reduction required for welding. Another method of controlling the tool penetration resides in the use of a tool member having a flat surface and projecting therefrom one or more welding indenters having a predetermined height from said surface corresponding to the desired depth of the indentation to be produced, that is, with said surface acting as an abutment or limit stop for the indenter or indenters penetrating the metal during welding.

Where a first member, such as a strip, is to be welded to a second member, such as a plate, or sheet, by a multiplicity of spaced and aligned indentation welds, difficulties have been experienced in the past in producing the plural welds efficiently and expeditiously without shifting or relatively displacing the members as a result of the distorting forces on the metals during welding. As an example, in the utilization of an aluminum strip conductor wound into a spiral electromagnetic winding for use in power transformers or the like electrical devices, it is required to join a terminal tab or narrower strip at right angle to said first strip, such joint being advantageously made by cold pressure welding in the form of an array or series of indentation spot welds, to provide both an efficient mechanical bond as well as an intimate electrical contact connection between the strips. If the weld joints are made individually and successively by means of a tool having a single indenter, great difficulties prevail in maintaining the members in proper relative position during welding, whereby the contact or connecting strip may be considerably displaced relative to the main strip or conductor at the end of the multiple welding operation, quite aside from the low efficiency of the welding process in shifting the tool or feeding the strips from one to the next weld spot during operation. On the other hand, use of a composite tool fitted with a plurality of integral spaced indenters, while allowing the contact strip to be welded to the main strip by a single operation, makes it difficult if not practically impossible for an operator to line up these indenters on a lead or strip with existing tools such as to prevent skewing or shifting of the strips, as well as other drawbacks, during welding. Besides, integral multiple indenters greatly increase the problem of sticking of the tool to the members upon welding, thus making it difficult or requiring special tools or skill in removing the members from the press after welding.

Accordingly, an important object of the present invention is the provision of an improved pressure welding tool, especially, though not limitatively, designed for the production of plural single-sided indentation spot welds, by which the foregoing and related difficulties and defects are substantially eliminated or minimized.

Among the more specific objects of the invention is the provision of a pressure welding tool of this type by which shifting or relative displacement of the members during welding is substantially prevented, whereby to render such a tool especially suitable for the welding of a relatively narrow strip, such as a terminal conductor, to a wider strip or conductor by a series of aligned weld spots or joints; by which sticking of the tool or indenters to the members upon welding is substantially avoided or minimized; which will enable an easy and ready change of the tool penetration, to enable the use of the same tool for the welding of different gauge members or strips; and which is both simple in design and efficient in operation and may be operated without any special skill or requires the employment of specially trained labor.

The invention, both as to the foregoing and ancillary objects as well as novel aspects thereof, will be better understood from the following detailed description of a preferred practical embodiment, taken in conjunction with the accompanying drawings forming part of this specification and in which:

FIG. 1 is a cross-sectional view of a multiple-indenter pressure welding apparatus designed for producing a series of aligned rectangular indentation spot welds and constructed in accordance with the principles of the invention, the tool parts being shown in their position prior to welding;

FIG. 2 is a view similar to FIG. 1 and showing the tool in the position upon welding;

FIG. 3 shows, by way of example, a pair of metal strips welded by the aid of a tool according to FIGS. 1 and 2;

Like reference numerals denote like parts in the different views of the drawings.

Figure 4:
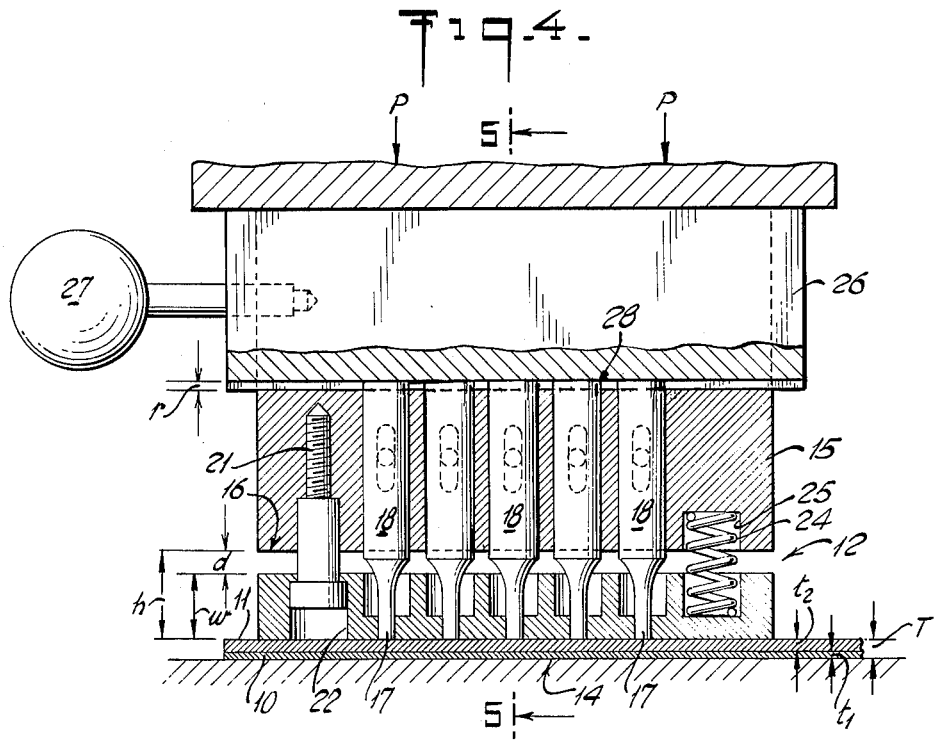
FIG. 4 is a cross-section, taken on line 4—4 of FIG. 5, of a modification of the tool according to the preceding figures, embodying means for adjusting the tool penetration to suit different gauge members to be welded.

With the foregoing objects in view, the invention involves generally the provision of improved indentation pressure welding apparatus of the type referred to for the joining by a single-sided pressure welding spot or spots of a pair of superposed cold pressure weldable metal (aluminum, copper, etc.) members, such as plates, strips or sheets, said tool comprising a flat anvil and a cooperating tool member having a flat tool surface and projecting therefrom one or preferably a multiplicity of welding indenters having a suitable rectangular cross-section. The tool is provided with suitable guide means to move said member toward and away from said anvil with said surface remaining substantially parallel to the anvil, for applying welding pressure to a pair of superposed members supported by said anvil and to produce an indentation spot weld or welds, in a manner well known. There is further provided in accordance with the improvements of the present invention a spring-loaded pressure plate or pad being spaced by a predetermined normal distance from said surface, and means mounting said plate upon said member for movement towards and away from said surface. Said plate has a hole or holes conforming to and passed by said indenters, whereby to define a predetermined effective projecting height of the indenters and, in turn, a tool penetration during welding determined by the difference between the normal or actual projecting height of the indenters from said surface and the thickness of said plate, respectively. As a consequence, the indenter or indenters may have a suitable size or length and can now be designed as separate elements mounted in the tool member, thus avoiding the difficulties of producing multiple aligned and integral indenters of a common tool member or block. According to a preferred example, the actual height of the indenters from the tool surface may be equal to the sum of the thickness of the pressure plate and the normal spacing distance of said plate from said surface, whereby the ends of the indenters passing through suitable holes in said plate will be flush with the outer surface of the latter. As a consequence, the plate presents a continuous bearing surface upon initially engaging the members to be welded, to thereby secure and positively locate the same prior and during the pressure application or welding. As a result, any relative displacement of the members due to the metal flow or distortion obtaining during welding will be eliminated or minimized, while sticking of the indenters to the members upon final penetration is counteracted by the resilient force tending to instantly retract the pressure plate upon release of the welding pressure or opening of the tool for the removal of the welded pieces.

By means of the plural spot welding tool of the type afore-described accurately aligned welds or spots may be produced, for instance, between a conducting strip and terminal strip substantially without relative displacement of the strips from their initial position.

The welding tool according to the invention, aside from the advantages and novel effects mentioned, lends itself especially and most simply to a variation or adjustment of the metal reduction or tool penetration, to enable the welding of different gauge members by means of a single tool or welding apparatus. According to this aspect of the invention, the indenter or indenters, instead of being relatively fixed or rigid with the tool member, are mounted for slidable adjustable engagement with the latter with further means being provided for controlling the extent of displacement or retraction of said indenters into said member, to result in a variation of the resultant tool penetration or metal reduction of the members being welded.

According to a preferred embodiment, the indenting tool member is provided with a recess adapted to receive different exchangeable abutment members or shim blocks closely fitting therein and each having a groove or depression of different depth, to limit the displacement of the indenters or produce a desired projecting height from the tool surface determinative of the final tool penetration. Exchange of one block for another having a different depth groove will result in a different tool penetration for the welding of different gauge sheets or strips, while the width and length of the weld spots or indenters, respectively, may remain constant over a substantial range of gauge thicknesses, in accordance with the general rules and techniques of cold pressure welding. In other words, according to the improved feature of the invention, both the pressure plate and the indenter or indenters are arranged to recede towards the indenting tool surface by predetermined and relatively variable distances, to result in a final tool penetration or metal reduction determined by the difference of said distances, in a manner as will become further apparent as the following description proceeds in reference to the drawings.

Referring more particularly to FIG. 1, the numerals 10 and 11 denote a pair of superposed members, such as sheets or strips, of cold pressure weldable metal (copper, aluminum, etc.) to be welded by a series of single-sided indentation spot welds, said members being supported by a first flat anvil or tool member schematically indicated at 14 and forming part of the welding apparatus or press collectively designated by the numeral 12 in the drawing. Cooperating with the anvil 14 is a second or indenting tool member 15 having a flat tool surface 16 and projecting therefrom a multiplicity of aligned welding indenters 17 of suitable and preferably rectangular cross-section for the production of a series or array of indentation spot welds 13 in the members 10 and 11 as more clearly shown in FIG. 3.

According to the embodiment of FIG. 1, the indenters 17 having a predetermined projecting height $h$ from the surface 16 are fixed relative to the member 15, such as by mounting of the inner bolt-shaped portions or punches 18 in suitable bores of the block or member 15 by pressfit engagement or by the aid of any other mounting or securing means. Tool member 15 is arranged in a known manner for movement towards and away from the anvil 14 with the surface 16 remaining parallel to the anvil by the provision of suitable guide and operating means (not shown) forming part of the apparatus and which may be of any construction and operated either manually, pneumatically, or in any other suitable manner. As a consequence, application of an adequate welding pressure to the members 14 and 15, as indicated by the arrows P in the drawing, will result in the indentation of the members 10 and 11 by the indenters 17 and welding by a series of cold pressure spot lap welds, as shown more clearly in FIG. 2 corresponding to the position of the tool at the end of the welding operation.

In order to create an intense interfacial metal flow at the indented areas between the members 10 and 11 conducive to welding of the members in a solid phase welding bond, it is necessary that the indenters 17 penetrate the material to a predetermined depth, that is, to a point below the initial interface between the members as shown in FIG. 2. In other words, a definite total percentage metal reduction R of the members must be achieved in order to effect welding, said reduction varying according to the gauge thickness and "figure of merit" of the material.

According to the present invention, control of the tool penetration or percentage reduction R is achieved by the provision of a spring-loaded pressure pad or plate 20 spaced from the tool surface 16 by a predetermined normal distance $d$ and being mounted upon the tool member 15 for parallel displacement relative to said surface by the provision of suitable guide means shown in the form of bolts 21 secured in the member 15 and having enlarged lower portions arranged to move within corresponding bores or recesses 22 in the plate 20, the height of said recesses defining the normal spacing distance $d$ between the plate 20 and tool face 16. A pair of coil springs 24 mounted in suitable recesses 25 of the plate 20 and member 15 serve to normally urge said plate in a direction away from the surface 16 as shown in FIG. 1, that is, to the position of normal or maximum distance $d$ from the member 15.

The height $h$ of the indenters 17 exceeds the width $w$ of the plate 20, whereby to result in an effective projecting height or tool penetration R being equal to the difference $h-w$. In the preferred construction as shown in the drawing, $h=w+d$, whereby the lower faces of the indenters 17 will be normally flush with the lower face of the plate 20 and the tool penetration or percentage reduction R of the members 10 and 11 upon welding will be equal to $d$, as seen from FIG. 2 showing the tool or press in the closed or operative position. As a consequence, the percentage reduction R is defined by the relation of two dimensions, that is, $h$ and $w$ which may be chosen as desired to simplify the design as well as the construction of the tool, while ensuring the required accuracy or precision in a practical and economical manner. Furthermore, the fact that, in the embodiment shown, the members 10 and 11 are initially engaged by the uniform surface composed by the faces of the indenters 17 and the plate 20 results in said members being firmly gripped prior to the starting of the indenting or welding operation, in such a manner as to prevent relative displacement of the members both prior to and during welding. Thus, for instance, a contact strip 11 welded to a sheet or strip conductor 10 by a series of spot welds 13, FIG. 3, will retain its initial (right angle) position throughout the welding operation.

The members 10 and 11 may have the same gauge thickness in which case the reduction R required for welding should be about 70% in the case of aluminum, and 85% in the case of copper, of the total thickness of the members, while the width and length of the weld spots is determined by the common gauge of the members, as pointed out hereinbefore. If both members are of a different thickness, the indentation may be made through the thinner member in the form of weld spots determined by the gauge of the thinner member and with a tool penetration or reduction R being equal to 1, 2–1, 4 times the gauge thickness of the thinner member, according to well known cold pressure welding technique.

It has been found, however, that within a limited range of relative thickness of the members 10 and 11 not exceeding about 1:3, it is advantageous to weld from the thicker member having a gauge $t_2$ in the example shown into the thinner member having a thickness $t_1$. In such a case, the dimensions of the weld spot are determined by the indented or thicker member, while the reduction R may be the same as given for members of like thickness, that is, 75% of the total thickness T for aluminum and 85% for copper. In the case where the members are of different hardness, such as in welding a copper strip 11 to an aluminum strip 10 of lesser thickness the dimensions of the weld areas or spots may be the same as if both members were of the same and greater thickness ($t_2$), while the reduction R is advantageously midway between that for copper and aluminum, that is, about 80%, and similarly for other metals or combinations.

According to an improved feature of the invention, the tool penetration or reduction R is made adjustable, to allow the same tool to be used for the welding of members or strips of different gauge thickness. This aim is achieved in a simple manner by slidably mounting the bolts 18 in the member 15 for adjustment to a predetermined position or variation of the height $h$ of the indenters 17 from the surface 16 by means of set screws or the like securing means cooperating with suitable scale indicating means.

Figure 5:
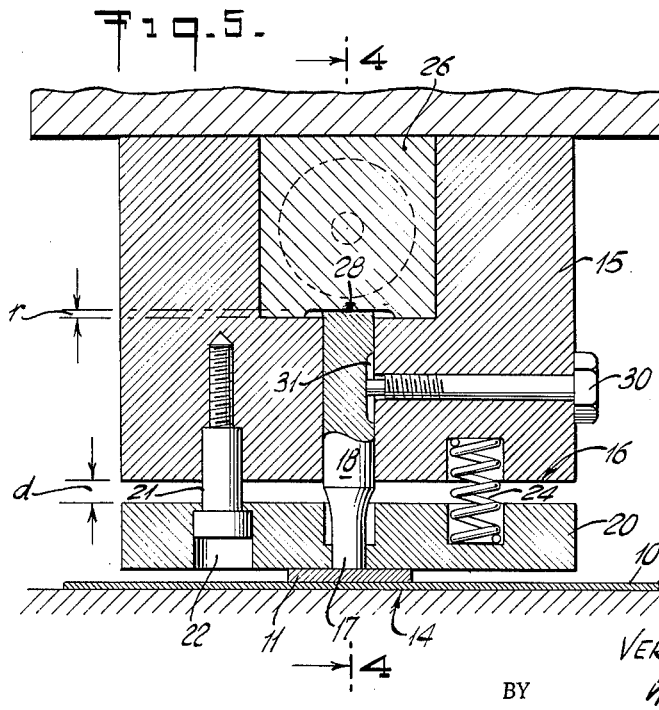
FIG. 5 is a section taken on line 5—5 of FIG. 4.

According to the preferred construction as shown by FIGS. 4 and 5, the effective projecting height $h$ of the indenters 17 at the end of the pressure application is set or adjusted by the provision of a plurality of exchangeable shim or adjusting blocks or bars 26 having an operating knob or handle 27 and fitting in a corresponding recess of the tool member 15. The bars 26 are provided, in the example shown, with a throughgoing groove or recess 28 coinciding with the inner ends of the bolts 18 which terminate in the indenters 17. In use, after insertion of the proper bar 26 having a groove 28 of appropriate depth corresponding to the desired gauge thickness, the bolts 18 upon displacement into engagement with the bottom of the groove 28 may be locked by means of securing screws 30, FIG. 5. Alternatively, the bolts 18 may be slidably mounted in the member 15 to operate in the form of a lost-motion connection by the ends of the screws 30 or the like engaging a longitudinal recess 31 in the bolts, in such a manner as to displace the indenters 17 inwardly during welding to an extent determined by the depth $r$ of the groove 28 and to cause welding at reduced effective metal reduction R in cooperation with the plate 20, in the manner understood from the foregoing. In the case of the maximum projecting height of the indenters 17 being equal to $h$ that is, with the depth $r$ of the recess 28 being equal to zero, whereby the sum of the plate thickness $w$ and distance $d$ equals the height $h$, the metal reduction R will be equal to $d$, as in FIGS. 1 and 2, while an increase of $r$ will result in a decrease of R until reaching zero reduction for $r=d$, as will be understood.

As will be evident, the spring-loaded pressure plate 20, aside from its function and effects as described, provides additional guidance for the indenters 17 and acts to prevent sticking to the work by the action of the springs 24 in instantly retracting the indenters upon release of the welding pressure or opening of the tool for the removal of the parts after welding.

In the foregoing the invention has been described in reference to a specific illustrative device or embodiment. It will be evident, however, that variations and modifications, as well as the substitution of equivalent elements or parts for those shown for illustration, may be made in accordance with the broader scope and spirit of the invention as set forth in the appended claims. The specification and drawings are accordingly to be regarded in an illustrative rather than in a restrictive sense.

I claim:

1. The combination with an indentation pressure welding tool of the type comprising a flat anvil, a cooperating tool member having a flat surface, at least one welding indenter projecting from said surface and having a cross-section conforming to the indentation weld spot to be produced, and means to move said member towards and away from said anvil with said surface remaining parallel to the anvil, for applying welding pressure to a pair of superposed cold pressure weldable members supported by said anvil; of a spring-loaded pressure plate of predetermined thickness being parallel to and spaced by a predetermined normal distance from said surface, means mounting said plate upon said member for movement towards and away from said surface, said member having a recess and said indenter mounted for relative movement within said member at right angle to said surface, and exchangeable abutment means within said recess to limit the inward movement of said indenter from said surface, said plate having a guide hole conforming to and passed by said indenter, and said indenter having a minimum projecting height from said surface in excess of the thickness of said plate.

2. In a cold pressure welding tool as claimed in claim 1, the maximum projecting height of said indenter exceeding the thickness of said plate to an extent equal to said predetermined distance between said surface and said plate.

3. In a cold pressure welding tool as claimed in claim 1, said abutment means consisting of a removable bar closely fitting said recess and having a groove of predetermined depth arranged to be engaged by the inner end of said indenter.

4. In a cold pressure welding tool as claimed in claim 3, the depth of said groove being a fraction of said predetermined distance.

5. The combination with an indentation pressure welding tool of the type comprising a flat anvil, a cooperating tool member having a flat surface and projecting therefrom a multiplicity of spaced and aligned welding indenters of oblong rectangular cross-section, and means to move said members toward and away from said anvil with said surface remaining parallel to the anvil, for applying welding pressure to a pair of superposed cold pressure weldable members supported by said anvil; of a spring-loaded pressure plate of predetermined thickness being parallel to and spaced by a predetermined normal distance from said surface, means mounting said plate upon said member for movement towards and away from said surface, said member having a recess and said indenters mounted for relative movement within said member at right angle to said surface and an exchangeable abutment member closely fitting said recess and having a groove of predetermined depth arranged to be engaged by the inner end of said indenters, whereby to control the penetration of said indenters into the members being welded by said depth in cooperation with the thickness of said plate.

6. In a cold pressure welding tool as claimed in claim 5, the maximum projecting height of said indenters for zero depth of said groove being equal to the sum of said predetermined spacing distance and the thickness of said plate, and the depth of said groove being less than said predetermined distance.

7. In indentation cold pressure welding apparatus of the type comprising a flat anvil, a cooperating tool having a flat surface and projecting therefrom a plurality of mutually spaced and aligned welding indenters having a cross-section conforming to the weld spots to be produced, and means to move said tool towards and away from said anvil with said surface remaining parallel to said anvil, for applying welding pressure to a pair of superposed cold pressure weldable members supported by said anvil, to join said members by a series of indentation pressure welds; of a pressure plate having a predetermined thickness and disposed parallel to said surface, said plate provided with a plurality of apertures each traversed by one of said indenters, and means mounting said plate upon said tool for relative movement towards and away from said surface including resilient and stop means, to urge said plate to a normal position of predetermined distance from said surface, said indenters having a projecting height from said surface to cause said plate to grip said members during welding by the action of said resilient means and to limit the final metal reduction thereof at the weld areas by the thickness of and upon said plate engaging said surface.

8. In cold pressure welding apparatus as claimed in claim 7, said indenters having an oblong rectangular cross-section and being arranged normal to a common aligning axis.

9. In a cold pressure welding apparatus as claimed in claim 7, said indenters having an oblong rectangular cross-section and being arranged normal to and in mutually equidistant relation along a common aligning axis.

References Cited by the Examiner

UNITED STATES PATENTS

| | | | |
|---|---|---|---|
| 466,476 | 1/1892 | Webster | 78—52 |
| 873,640 | 12/1907 | Waddington | 78—52 |
| 2,378,642 | 6/1945 | Kopplin. | |
| 2,736,090 | 2/1956 | Sowter | 29—497.5 |
| 2,763,057 | 9/1956 | Clair | 29—470.1 |
| 2,894,322 | 7/1959 | Clair | 29—497.5 |
| 3,122,035 | 2/1964 | Wahl | 78—52 |

CHARLES W. LANHAM, *Primary Examiner.*